3 Sheets—Sheet 1.

C. L. GRIMES.

HYDROSTATIC TIRE SETTER.

No 11,307. Reissued Feb. 7, 1893.

Witnesses:

James P. Duhamel

Horace A. Dodge

Charles L. Grimes,
Inventor by Dodger & Sons,
His Attys.

C. L. GRIMES.

HYDROSTATIC TIRE SETTER.

No. 11,307. Reissued Feb. 7, 1893.

Witnesses:

James F. Duhamel

Horace A. Dodge.

Charles L. Grimes,
Inventor, by Dodge & Sons
Attys.

C. L. GRIMES.

HYDROSTATIC TIRE SETTER.

No. 11,307. Reissued Feb. 7, 1893.

Witnesses:

James F. Duhamel

Horace A. Dodge.

Charles L. Grimes,
Inventor, by Dodge & Sons
Attys.

UNITED STATES PATENT OFFICE.

CHARLES LOOMIS GRIMES, OF MOLINE, ILLINOIS, ASSIGNOR TO WILLIAM WHITE & CO., OF SAME PLACE.

HYDROSTATIC TIRE-SETTER.

SPECIFICATION forming part of Reissued Letters Patent No. 11,307, dated February 7, 1893.

Original No. 442,579, dated December 9, 1890. Application for reissue filed July 28, 1892. Serial No. 441,538.

*To all whom it may concern:*

Be it known that I, CHARLES LOOMIS GRIMES, a citizen of the United States, residing at Moline, in the county of Rock Island and State of Illinois, have invented certain new and useful Improvements in Hydrostatic Tire-Setters, of which the following is a specification, reference being had to the annexed drawings, making part of this specification, in which like letters of reference in the several views refer to like parts.

The object of my said invention is the novel construction of a machine for setting the tires on the wheels of vehicles by means of hydrostatic pressure; and the means by which I attain this object consists, primarily, in a system of simultaneously converging pistons or plungers, the inner ends of which impinge against the periphery of the tire to be set upon the wheel, and all act simultaneously by the pressure of water which is forced into an annular passage-way by a force-pump adapted to that purpose.

Figure 1:
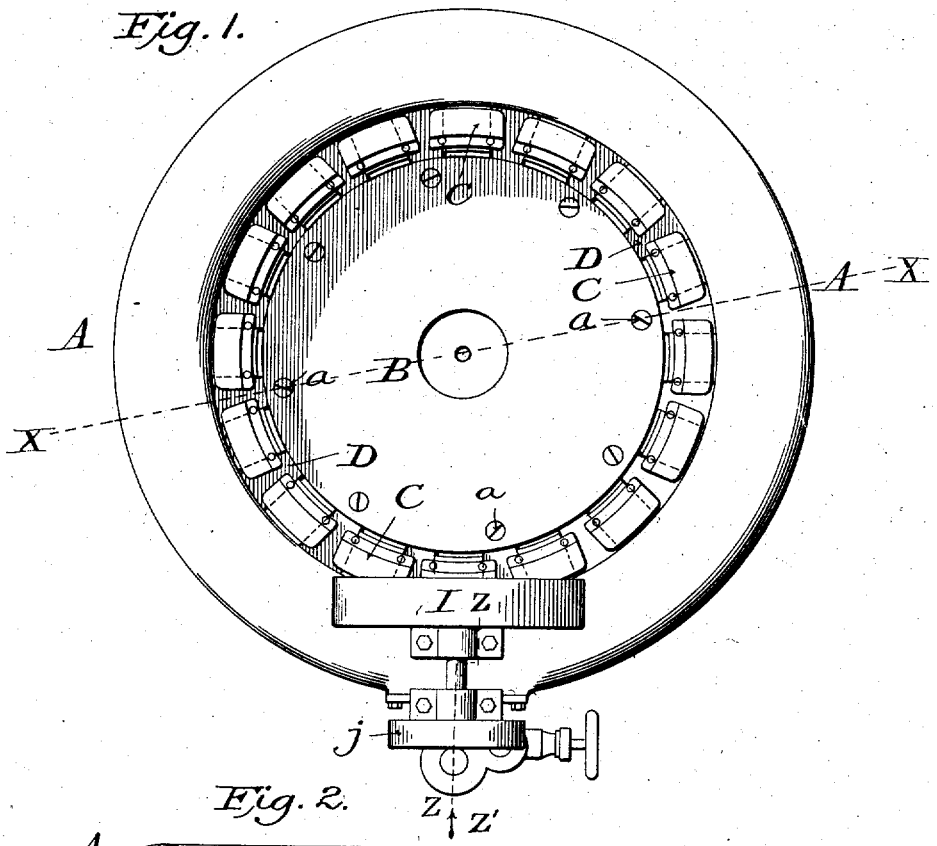
Figure 2:
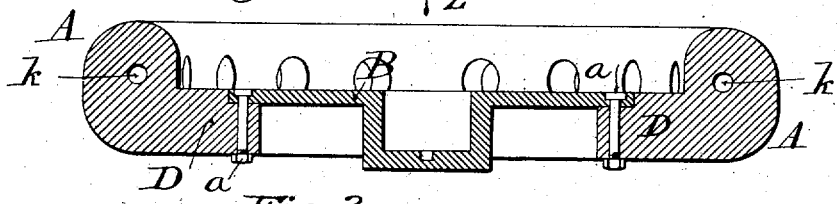
Figure 3:
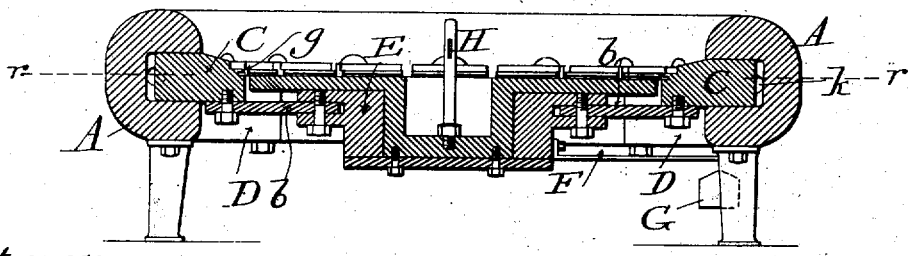
Figure 4:
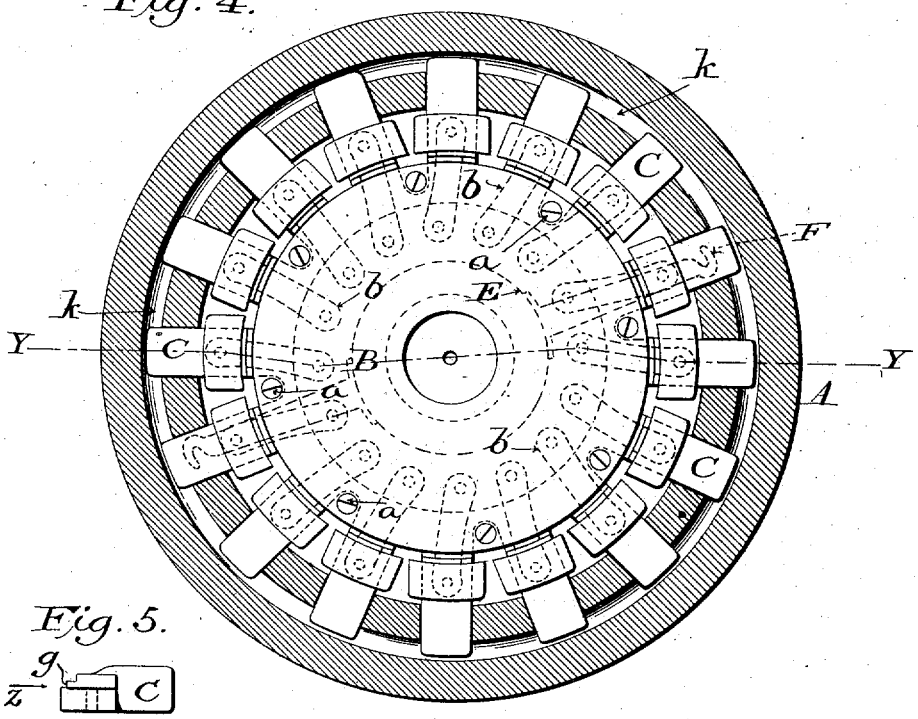
Figure 5:
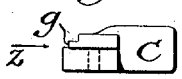
Figure 6:
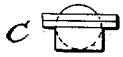
Figure 14:
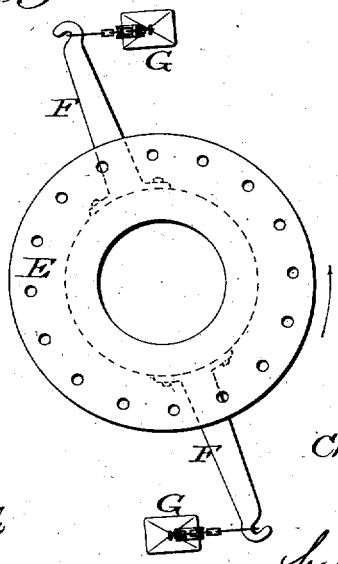
Figure 7:
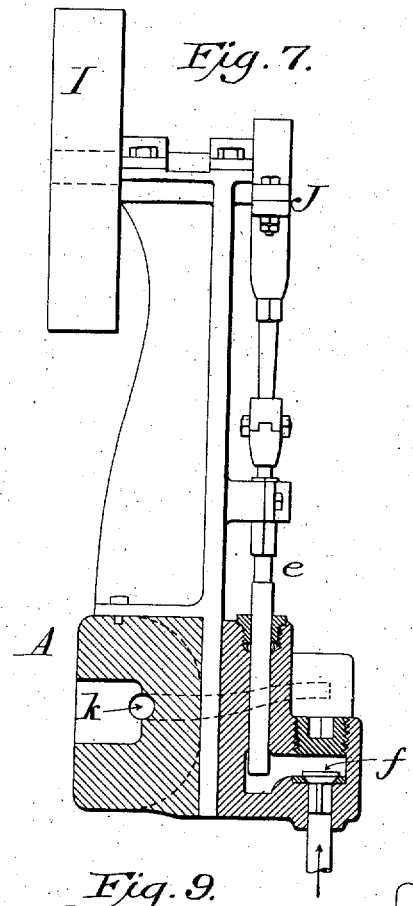
Figure 8:
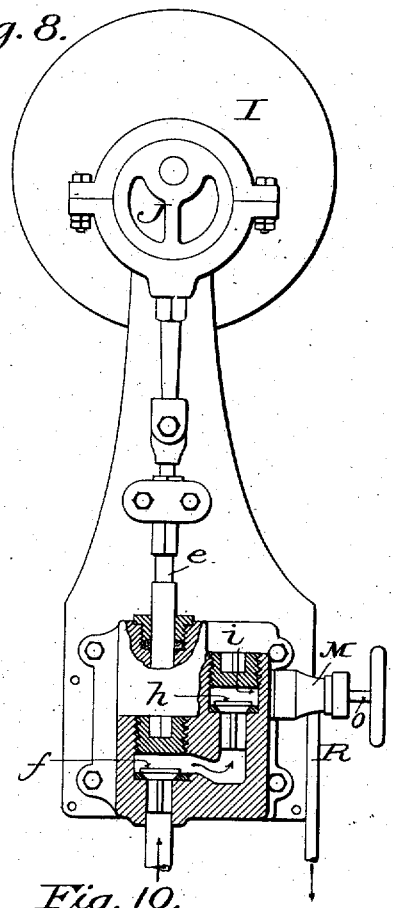
Figure 9:
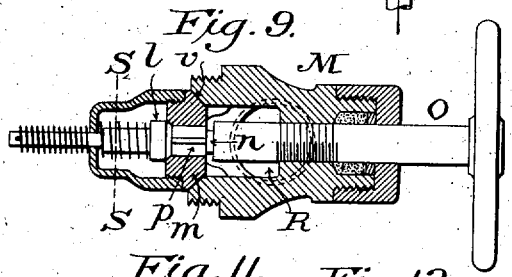
Figure 10:
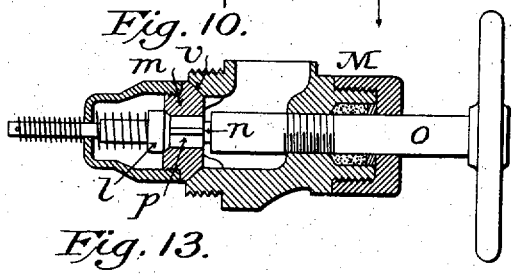
Figure 11:
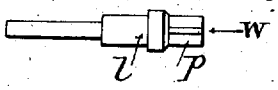
Figure 12:
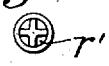
Figure 13:
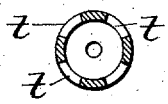

In the drawings, Figure 1 represents a top view of a tire setter operated by hydrostatic pressure and embodying my invention. Fig. 2 is a vertical section of the same, on the line *x—x* in Fig. 1 with the pistons removed. Fig. 3 is a similar section on the broken line Y Y in Fig. 4. Fig. 4 is a horizontal sectional view on the line *r—r* of Fig. 3. Fig. 5 is a side elevation of one of the several pistons. Fig. 6 is an view of same part as seen in the direction indicated by the arrow Z in Fig. 5. Fig. 7 is a section of the pumping apparatus on the line *z—z* in Fig. 1. Fig. 8 is a front view of same parts as seen in the direction of the arrow Z′ in Fig. 1. Fig. 9 is a section of a relief-valve, drawn on an enlarged scale. Fig. 10 is a transverse section of the relief valve. Fig. 11 is a side view of the relief valve. Fig. 12 is an end view of the valve as seen in the direction of the arrow *w* in Fig. 11. Fig. 13 is a section on the line *s—s* in Fig. 9. Fig. 14 is a top view of a part of the equalizing device for securing uniform movements of the converging pistons.

A is the annular rim or base of the machine; B, the center plate or disk made firm at intervals to the inwardly extending arms of the rim; C C C, &c., a series of converging pistons or plungers operated by means of the pressure of water behind them to force them against the tire to be set upon the wheel.

D, the inwardly extending arms, cast integral with the rim A between the pistons C C C, &c., and forming guideways for their movement back and forth, and also acting as supports for the central disk B, to which it is made firm by bolts *a*.

E is the equalizing-ring, carrying the connecting-links *b b b*, &c.

F F, Figs. 3 and 14, are two arms firmly secured to the ring E and supporting the two weights G G, for the purpose hereinafter set forth.

H is the center standard, around which the hub of the wheel is placed at time of laying the wheel in the machine.

I is the driving-pulley of the pump for operating the eccentric *j* and piston *e*.

*f* is the primary check-valve, through which the water is drawn up at the upward stroke of the piston *e*.

*h* is the secondary check-valve, through which the water presses at the downward stroke of the piston, and thence into the annular water-passage *k* in the interior of the rim A.

Fig. 9 represents a horizontal section of the compound relief-valve through which the spent water returns from the water-passage to the cistern. This valve, taps the water-chamber *i* directly over the secondary check-valve *h* Fig. 1 or between that valve and the water passage *k* Fig. 8. At the proper time for discharging the water out of the water passage (the tire being then set) the pressure is necessarily so great as to almost forbid the opening of a valve, which is large enough to let the water out as quickly as is desired. To obviate this difficulty I have provided the machine with what might be called a small "auxiliary valve" for the immediate relief of this maximum pressure. This is the small valve *l*, placed within the larger valve *m*, and to be first acted upon by the diminished end *n* of the shaft *o*, (of the hand-wheel,) which strikes the end *p* of the valve *l* and lifts its beveled collar out of its seat in the valve *m*, and thus relieves in advance the immediate heavy pressure before the large valve *m* is lifted out of its seat *v* in the shell M, which latter is effected by a still further turn of the hand-wheel. It will be understood that as the water is let in through the openings *t*, Fig. 13, of the archway above the valve *m* it has unobstructed passage between said valve and the beveled collar of the valve *l* (when the latter is opened) and out through the recesses *r'* of the stem of the valve and down through the waste-pipe R into the cistern below, as shown at Fig. 8.

In Fig. 4 I have shown in dotted lines an equalizing ring E and the connecting-links *b b b*, &c., connecting the ring with their respective pistons or plungers C C C, &c., the mode of connecting these links to the ring and to the pistons being also shown in Fig. 3. It will be observed that these links are not arranged upon radial lines, but are set a little out of line between the pistons and the center of the circle, so that as the pistons are made to approach nearer toward the center when operating to set a tire, the ring will turn slightly around the center hub in the direction of the arrow in Fig. 14, and in doing so it will necessarily carry the arms F F around so as to raise the weights G G, and as the pressure of the water is taken off from behind the pistons by the relief valve, the weights will gradually sink down, and thus, through the rings and links, will the pistons be all simultaneously pushed back into their respective openings in the rim preparatory to receiving another tire to be operated upon. I have in the drawings illustrated sixteen plungers or pistons. I have chosen that number only as the preferable one; but as the same results can be substantially accomplished with a greater or less number I do not wish to limit myself to the use of that exact number. It will be observed, however, that the less the number of these pistons the longer will be the contacting surface of the shoulders *g* with the tire, and consequently the greater will be the sliding friction of each with the upsetting portion of the tire contiguous thereto. So it is doubtful if as low a number as three could be successfully worked. These pistons are all faced off as to their shoulders *g* while in their respective places in the machine, by a lathe, to the exact size which it is intended the tire shall assume when set upon a wheel, thereby causing it to become a perfect circle.

The operation of the machine is then as follows, to wit: The tire to be set upon a given wheel is first placed loosely upon the wheel and both are placed upon the plate B of the machine just inside of the longer circular lines designating the impinging surfaces of the plungers or pistons, as seen in Fig. 4 so as to be operated upon by the shoulders *g*, Figs. 3 and 5. The power is then applied to the pulley I of the pump. As the piston of the pump is lifted the water follows up under it through the valve *f*, and at the downward stroke the valve closes, and the water is forced up through the secondary valve *h* into the chamber *i*, thence to and into the water channel *k* through the passage-way shown in dotted lines in Fig. 7, and thus the power applied to the driving-pulley I is exerted equally through all the pistons upon the tire, which is thereby shortened or upset to fit the wheel. As the plungers or pistons are driven forward by the action of the water behind them, the ring E is slightly turned in the direction indicated by the arrow, and the weights are thereby raised to return the motion imparted by the pressure of the water behind the pistons and to replace the machine in position to repeat the operation. There is, however, one other function which the weights, ring, and links are intended to perform, and that is to prevent any one or more of the pistons from advancing faster or slower than any of the others. As soon as the act of contracting the tire is completed, the next step is to release the wheel from the machine, which is accomplished simply by a few turns of the hand wheel, by means of which all the water in the machine is let out through the compound valves *l m* into the same cistern below from which the supply is drawn up to operate the machine. It will be understood that these pistons are all made water-tight by means of packings of the usual form for hydrostatic presses.

Having thus described my invention, what I claim is:—

1. In a hydrostatic tire-setter, the combination of the simultaneously-converging pistons C C C C, &c., and an equal number of links *b b b b*, connecting said pistons with the centrally-pivoted ring E, said links being set at an angle with radial lines and adapted to insure an equal and uniform travel of the pistons, all arranged and operating substantially as set forth.

2. In a hydrostatic tire-setter, the combination with the hollow chamber, and the radially-moving pistons projecting from the inner face thereof, of a support for the wheel located centrally with reference to the pistons, and a fluid-pressure mechanism and an equalizing device for forcing the pistons simultaneously and equally inward toward one another, all substantially as shown and described.

3. In a hydrostatic tire-setter, the combination with the hollow annular chamber, of the central wheel-support, the radial pistons projecting from the inner face of the chamber, fluid-pressure mechanism for forcing the pistons inward toward each other simultaneously, and means for retracting the pistons, all substantially as shown and described.

4. In a hydrostatic tire-setter, the combination with the hollow chamber and the radially-moving pistons, of a fluid pressure mechanism for forcing the pistons inward toward one another, a wheel-support, and means substantially such as shown and described for automatically retracting the pistons.

5. In a hydrostatic tire-setter, the combination with the hollow rim A having the arms D, of the plate B secured to said arms, the radial pistons, and a fluid-pressure mechanism for forcing the pistons simultaneously inward toward each other.

6. In a hydrostatic tire-setter, the combination with the hollow rim A, of the plate B secured thereto and provided with a depending boss or hub; a ring E journaled on the hub, a series of radial pistons C, links *b* connecting the pistons with the ring; a fluid pressure mechanism for forcing the pistons inward, and mechanical means for partially rotating the ring and retracting the pistons.

7. In a hydrostatic tire-setter, the combination with the hollow rim A and disk or plate B, of the radial pistons C and a fluid pressure mechanism for forcing the latter inward, a ring E journaled on the plate or disk, links *b* connecting the pistons and ring, arms F projecting from the rings, and weights G suspended from the arms and passing over an intermediate pulley or support.

8. In a hydrostatic tire setter, the combination with the hollow chamber, of the radially-moving pistons, and fluid pressure mechanism for projecting or forcing the pistons from the inner face of the hollow chamber.

CHARLES LOOMIS GRIMES.

Witnesses:
JNO. J. WILLIAMS,
H. A. AINSWORTH.